United States Patent
Lopez Uran et al.

(10) Patent No.: US 11,492,174 B2
(45) Date of Patent: Nov. 8, 2022

(54) TRANSPORT PLATFORM INCLUDING ADAPTER ELEMENTS

(71) Applicants: SCHOELLER ALLIBERT GMBH, Schwerin (DE); CHEP TECHNOLOGY PTY LTD., Macquarie Park (AU)

(72) Inventors: Daniel Lopez Uran, London (GB); Malcolm Cant, Wokingham (GB); John Huizingh, AH Vlagtwedde (NL)

(73) Assignee: CHEP Technology Pty Limited, Sydney (AU)

( * ) Notice: Subject to any disclaimer, the term of this patent is extended or adjusted under 35 U.S.C. 154(b) by 0 days.

(21) Appl. No.: 17/254,925

(22) PCT Filed: May 29, 2019

(86) PCT No.: PCT/EP2019/064106
§ 371 (c)(1),
(2) Date: Dec. 22, 2020

(87) PCT Pub. No.: WO2020/001917
PCT Pub. Date: Jan. 2, 2020

(65) Prior Publication Data
US 2021/0261292 A1    Aug. 26, 2021

(30) Foreign Application Priority Data
Jun. 27, 2018 (EP) .................................. 18180176

(51) Int. Cl.
*B65D 19/00* (2006.01)
*B65D 19/44* (2006.01)
(Continued)

(52) U.S. Cl.
CPC ......... *B65D 19/0002* (2013.01); *B65D 19/44* (2013.01); *B62B 3/16* (2013.01);
(Continued)

(58) Field of Classification Search
CPC ................ B65D 19/0002; B65D 19/00; B65D 2519/00756; B65D 2519/00746; B65D 2519/00547
(Continued)

(56) References Cited

U.S. PATENT DOCUMENTS 3,091,487 A * 5/1963 Gallagher ............. F16B 5/0064
403/381
3,994,242 A * 11/1976 Damberg ............. A47B 47/021
108/64

(Continued)

FOREIGN PATENT DOCUMENTS

DE    10 2009 041436    3/2011
EP    2918510           9/2015
(Continued)

*Primary Examiner* — Jose V Chen
(74) *Attorney, Agent, or Firm* — Alle, Dyer, Doppelt + Gilchrist, PA

(57) ABSTRACT

An adapter element and a transport platform, such as a dolly (1), including at least one such adapter element (5), said at least one adapter element (5) being connected or connectable to the dolly (1) and having a rim portion (6) protruding from a deck (2) of the dolly (1) for restraining loads placed on top of the deck (2) at least in a lateral direction, wherein the at least one adapter element (5) is provided with one or more legs (8, 12; 8, 12, 17,.18) each comprising an engagement portion (9, 13; 9;13, 19, 20), preferably tabs or protrusions, for being received and snap-fitted into a corresponding opening (10, 15) provided in the deck (2). An outer leg (12) of the one or more legs (8, 12; 8, 12, 17, 18) is formed as a tab or tongue having a through hole (13) which serves as an engagement portion of the outer leg (12).

20 Claims, 6 Drawing Sheets

(51) Int. Cl.
  *B62B 3/16* (2006.01)
  *B62B 5/00* (2006.01)
(52) U.S. Cl.
  CPC .... *B62B 5/0093* (2013.01); *B65D 2519/0096* (2013.01); *B65D 2519/00268* (2013.01); *B65D 2519/00288* (2013.01); *B65D 2519/00308* (2013.01); *B65D 2519/00318* (2013.01); *B65D 2519/00343* (2013.01); *B65D 2519/00781* (2013.01); *B65D 2519/00815* (2013.01)
(58) Field of Classification Search
  USPC ................................ 108/53.1, 56.1, 54.1, 64
  See application file for complete search history.

(56) References Cited

U.S. PATENT DOCUMENTS

| | | | | |
|---|---|---|---|---|
| 4,296,524 | A * | 10/1981 | Horholt | F16B 5/0028 16/225 |
| 4,409,906 | A * | 10/1983 | Alneng | A47B 87/002 108/185 |
| 4,700,986 | A * | 10/1987 | Davis | A47B 3/14 108/64 |
| 5,105,746 | A * | 4/1992 | Reynolds | B65D 19/0012 108/54.1 |
| 5,144,888 | A * | 9/1992 | Heine | A47B 87/002 108/64 |
| 5,351,627 | A * | 10/1994 | Junaedi | B65D 19/0012 108/56.1 |
| 5,809,905 | A * | 9/1998 | John | B65D 19/0018 108/56.1 |
| 6,485,219 | B1 * | 11/2002 | Beyer | A47B 87/008 403/338 |
| 6,685,200 | B1 | 2/2004 | Giannoni et al. | |
| 8,146,517 | B1 * | 4/2012 | Masser | E04F 15/02417 108/64 |
| 8,176,857 | B2 * | 5/2012 | Ochs | A47B 87/002 108/64 |
| 8,438,980 | B2 * | 5/2013 | Pichereau | B65D 19/0016 108/56.1 |
| 10,815,028 | B1 * | 10/2020 | Turner | E01C 5/001 |
| 2003/0131766 | A1 * | 7/2003 | Petlakh | E04F 15/02464 108/64 |
| 2005/0011791 | A1 | 1/2005 | Bartholomew et al. | |
| 2006/0075938 | A1 * | 4/2006 | Meissen | B65D 19/38 108/54.1 |
| 2012/0298014 | A1 * | 11/2012 | Wilson | B65D 19/0016 108/53.1 |
| 2015/0068436 | A1 * | 3/2015 | Zelek | B65D 21/0233 108/53.3 |
| 2015/0274360 | A1 | 10/2015 | Dye et al. | |
| 2015/0289647 | A1 * | 10/2015 | Lin | F16B 5/0064 108/64 |
| 2016/0090209 | A1 * | 3/2016 | Brisendine | B65D 19/0018 108/56.1 |
| 2018/0346192 | A1 * | 12/2018 | Thurston | B65D 90/12 |
| 2019/0144163 | A1 * | 5/2019 | Lim | B65D 19/385 108/53.5 |
| 2021/0024252 | A1 * | 1/2021 | Wang | B65D 19/44 |
| 2021/0323725 | A1 * | 10/2021 | Fitzgerald | B65D 19/385 |

FOREIGN PATENT DOCUMENTS

| | | |
|---|---|---|
| GB | 2422364 | 7/2006 |
| JP | 2008 155921 | 7/2008 |
| WO | WO 2017/130167 | 8/2017 |

* cited by examiner

TRANSPORT PLATFORM INCLUDING ADAPTER ELEMENTS

The present invention relates to a transport platform, more particularly to a dolly or a pallet, including at least one adapter element, said at least one adapter element being connected or connectable to the dolly and having a rim portion protruding from a deck of the dolly for restraining loads placed on top of the deck at least in a lateral direction. Therein, the at least one adapter element is provided with one or more legs, each comprising an engagement portion, preferably a tab or a protrusion, for being received and snap-fitted into a corresponding opening in the deck. The present invention further relates to an adapter element for use in such a transport platform.

BACKGROUND OF THE INVENTION

Pallets, dollies or transport rollers are well-known logistic components for transporting goods of nearly all sizes, shapes, loads and environments. Therefore, there is a multitude of different dollies and pallets that are adapted for specific purposes, shaped for receiving specific containers and goods or having a simple flat surface. In particular, dollies and pallets are often provided for boxes, plastic crates or trays having top side stacking rims as well as corresponding stacking structures on their lower surfaces to enable secure stacking of several identically shaped boxes on top of one another. Since dollies and pallets are produced in large numbers, manufacturing must be of low cost and enable simple and fast assembly.

PRIOR ART

EP 2 470 409 B1 discloses a dolly having castors and a deck with a stacking rim for transporting stackable boxes. Therein, corner elements of the deck including corners of the frame are inserted into longitudinal grooves extending from the corners of the deck towards its centre. The corner elements can be moved within those grooves and fixed via lateral clamping bolts for adjusting the frame for supporting containers of different sizes. Assembling the corner elements of this dolly is time consuming and thus expensive. Also, in case a user does not fully tighten one of the bolts, lateral support in the respective direction might be weak or even non-existent, thus leading to accidents.

From EP 3 098 136 A1 a dolly having castors and a deck with a flat top surface and flanks is known. L-shaped elastic restrainers for providing lateral support can be removably attached at the flanks on corners of the deck. The restrainers have lateral tabs which can be inserted into corresponding openings on the flanks of the deck by bending the restrainers. Further, restrainer brackets extending parallel to the top surface of the dolly are provided for fixing the restrainer to said top surface via screws. Thus, assembling the restrainers to the deck is time consuming. In case the screwing connection is omitted, the tabs are prone to slipping out of the respective openings if lateral load is applied. While snap-fit coupling via receiving slots in the flank is mentioned as an alternative, this connection can be pried or levered out and can be damaged easily, if the lateral load becomes high. Additionally it is questionable whether such restrainers are able to provide a stacking rim, since they must be easily bendable and therefore very thin. In case boxes would be stacked on top of these restrainers they would protrude beyond the edge of the dolly and would therefore be easily damaged. Further, hitting an obstacle while handling the dolly is a common occurrence upon which the laterally affixed restrainers, in particular the corresponding connection elements, and possibly any transported goods are likely to be damaged or broken.

SUMMARY OF THE INVENTION

In view of the above described problems it is an object of the present invention to provide a transport platform, such as a dolly, pallet or transport plate, which overcomes the aforementioned disadvantages. In particular, it is an object of the invention to provide a simple transport platform that can be adapted in a quick and simple manner to support loads such as stacking boxes securely. Further, the transport platform should be sturdy, easily assembled and produced cost-effectively.

The object is achieved by an adapter element having the features of claim 1 and a transport platform having the features of claim 10. In detail, a transport platform (or transport device), such as a dolly, a pallet or a transport plate, is provided with at least one such adapter element (or interface) being connected or connectable to the transport platform. The adapter element according to the invention has a rim portion protruding from a deck of the transport platform for restraining or securing loads placed on top of the deck at least in a lateral direction. The at least one adapter element is provided with at least one leg, each comprising an engagement structure or portion, preferably one or more tabs or protrusions, for being received and snap-fitted into a corresponding opening or set of openings provided in the deck in a top surface thereof. The set of openings set is configured to receive the one or particularly more legs of the at least one adapter element.

If the engagement structure of any leg is formed by one or more protrusions, these protrusions extend from the respective leg in the lateral direction. Preferably, the protrusions are substantially triangular blocks having a horizontal upper surface adapted to lie flush against a corresponding engagement structure of the deck as well as a lower surface which is tapered to form a slope or ramp enabling the leg to glide into the corresponding opening in the deck more easily.

According to the present invention, at least one opening is formed or provided in the top face or deck of the transport platform so that an adapter element can be snapped into such opening in the deck from above, thereby allowing a very quick and easy assembling (one step assembly) of the adapter element to the transport platform. Since the adapter element can be attached to the platform from above, the platform has to be accessible only from above during assembly. Since the adapter element is attached to the deck of the transport platform, it does not protrude laterally from the transport platform, thereby avoiding damage of the adapter element by obstacles, other transport platforms or vehicles, such as fork lifts, hitting against the dolly. Although protrusions and/or tabs and/or lugs are preferred as engagement portions, since these are cost-effective and simple, other engagement portions may be provided, such as spring loaded latches or the like. Also, the adapter element can be detached from the deck of the transport platform and may then be reused otherwise.

The transport platform may be formed as a (wheeled) dolly or as a pallet. The invention is not limited to any particular size of the dolly or pallet.

Each adapter element may be provided with a plurality of legs which may be inserted into a corresponding set of openings in the deck. The legs may have several different shapes and, in particular, may be shaped differently from one another. For example, one leg may be thick and sturdy, providing a snug or narrow fit with the respective opening for bracing against an inner surface of thereof, while another leg may be narrow and flexible. A symmetrical arrangement is preferred. Also, the legs may be arranged relatively to one another in directions in which lateral forces are likely to occur. For example, if one corner of the dolly or pallet would hit against an obstacle, the load would press against the rim portion in a direction from a centre of the deck towards the corner. Therefore it is advantageous, if at least two of the openings into which the legs are inserted or insertable are arranged between the corner and the centre of the dolly or pallet. Additionally or alternatively, the legs as well as their respective engagement portions may face in different directions in order to absorb forces acting in different directions optimally. In particular, engagement portions may define a certain angle between them and the outer flank or a part thereof, preferably facing corners of the dolly or pallet or a centre of a flank of the dolly or pallet.

In the context of the present invention, the wording "outwards" or "outer" relates to an orientation or direction away from a center of the deck of the dolly or pallet in the lateral direction, i.e. facing a surrounding environment, and the wording "inwards" or "inner" relates to an orientation or direction towards the center of the deck of the dolly or pallet in a lateral direction, i.e. facing away from the surrounding environment. Also, the wording "upwards", "upper" or the like relates to an orientation or direction orthogonal to the deck of the dolly or pallet in a loading or stacking direction. In contrast, the wording "downwards", "lower" or the like relates to an orientation or direction orthogonal to the deck of the dolly or pallet opposite to the stacking or loading direction, i.e. towards a lower side of the dolly or pallet or a floor underneath.

Preferably, the opening or openings in the deck for receiving the one or more legs are located at a distance from an upper edge of the deck (the opening or openings do not extend to the upper edge of the deck). The upper edge coincides with a flank or side surface of the transport platform. Accordingly, the legs are located at a distance from an outer flank of the rim portion. Due to this, legs inserted into the respective opening may be anchored into the deck in a stable manner and levering the adapter element from the deck is difficult. Further preferably, at least two longitudinal openings for receiving the legs, in this case at least two legs, are provided that extend parallel to the upper edge and that are arranged along a line connecting the upper edge and a centre of the deck at a distance from one another. Accordingly, at least two of the legs have an elongated shape extending parallel to the rim portion and to each other. That is, an area between two such openings and, correspondingly, matching legs inserted therein is rectangular or trapezoid-shaped, thus generating a rigid arrangement that may counteract any forces or torques applied to the adapter element. In particular, lateral forces acting on the rim portion and torques resulting therefrom can be held easily.

Preferably, each adapter element has at least one inner leg which is spaced apart from the rim portion in a lateral direction and preferably being arranged opposite thereto on the adapter element. Loads pressing against the rim portion, which may act as a lever, result in a torque acting on the respective adapter element. In case the inner leg is provided as described above, the inner leg can provide an anchor which acts against the torque via a lever resulting from the distance between the inner leg and the rim portion. Further preferably, each adapter element has at least one outer leg which is arranged adjacent to or overlapping the rim portion when viewed in a vertical direction. Due to this, the rim portion itself is connected directly to the deck. Thereby prying the adapter elements from the deck via obstacles getting caught beneath the rim portion is unlikely to occur.

Preferably, in each adapter element, the engagement portion of at least one of the legs is different from the engagement portion of another one of the legs. Due to this, the adapter elements can only be connected to the deck in one specific orientation. Assembling errors are therefore effectively prevented.

Preferably, the engagement portions of the dolly or pallet, into which the engagement portions of the one or more legs are snap-fitted or snap-fittable, are, in a first case, located within the opening or openings of the deck or, in a second case, at a lower side of the dolly or pallet directly adjacent to the opening or openings. In the first case the snap-fit connection is effectively protected against hits or getting caught on an obstacle. Thus damage of the connection or even undesired disengagement are prevented. In the second case, manufacturing is more cost-effective, since any elements that need machine-finishing are easily accessible, and also, if desired, the adapter elements may be detached easily.

Preferably, several openings or sets of openings, which are each configured to receive the one or more legs of the at least one adapter element, are provided in the deck so as to provide several positions at which the at least one adapter element is connectable to the deck. In particular, the openings or sets of openings may be distributed over the whole deck, preferably in accordance with dimensions of standard transporting boxes or stacking boxes. This allows to adapt the dolly or pallet according to the load to be stored or transported thereon, resulting in maximum flexibility and minimized manufacturing costs due to large lot sizes. Also, in this manner, several smaller loads may be supported on the deck independently from one another. Further preferably, the rim portion forms a section of a stacking rim corresponding to stacking boxes or a section of a restraining rim providing lateral support in general for goods loaded onto the deck. Preferably, the rim portion forms a rectangular corner rim, a longitudinal side rim or, at least partially, three sides of a rectangle.

Preferably, at the opening or openings or set of openings is or resp. are located such that, when the at least one adapter element is connected to the deck, the respective rim portion of the at least one adapter element is flush with the upper edge surrounding the deck, i.e. flush with the flank or side surface of a dolly or pallet body of the transport platform. This allows maximum utilization of the available space on the deck.

Preferably, each adapter element has a plate shaped base portion lying flush against the deck when the corresponding adapter element is connected to the deck. Accordingly, a load transported on the deck may be seated on top of the base portion. In this manner, the weight of the load presses down onto the base portion and i.e. the above described torque resulting from said load pressing against the rim portion may be counteracted by the weight of the load itself. Further, the weight of the load may result in a larger friction resistance between the deck and the base portion of the adapter element. In order to maximise this effect, additional layers having large friction coefficients may be provided between the deck and the respective base portions, or alternatively, a lower surface of the base portions may be coated with such a material.

Preferably, the deck has wheel recesses, further preferably four, which are adapted to accommodate wheels of another dolly or pallet stackable onto the dolly or pallet and which are preferably formed as hollow cylinder sections. In addition, each adapter element is formed in such a manner, and the opening or openings for receiving the one or more legs are located in such a manner that the wheel recesses are not covered by the respective adapter element when it is connected to the deck. That is, the base portions of the adapter elements have openings or cut-out portions which are adapted to provide access to the wheel recesses of the deck when the adapter elements are connected thereto. Further preferably, a lower side of the dolly or pallet may have a stacking structure corresponding to the stacking rim, which may be provided by the adapter elements. Thereby, dollies having wheels and/or dollies without wheels and/or pallets may be stacked on top of one another for space-efficient storing of the dollies and/or pallets, irrespective of whether the at least one adapter element is connected thereto or not.

Further preferably, at least one corner leg is provided which has an elongated shape extending in a horizontal direction and which has a predefined angle relative to the rim portion. It is particularly advantageous if the predefined angle is chosen such that a line extending orthogonally from a flank of the corner leg extends towards a corner of the deck when the adapter element is connected thereto. This improves robustness of the adapter elements regarding lateral forces acting on the rim portion at a non-orthogonal angle. For example, if the corner of the transport platform hits an obstacle during handling, the transport platform will be decelerated abruptly. Accordingly, goods loaded onto the deck will press in the direction of said corner resulting in an force acting in a non-orthogonal direction.

Preferably, four adapter elements are provided, wherein the rim portion of each adapter element forms either a rectangular corner rim or corner support or a longitudinal side rim or longitudinal side support. This corresponds to a first exemplary embodiment of the invention that will be described in more detail later. In particular, this embodiment allows maximum flexibility and adaptability of the dolly or pallet system. Also in this embodiment, the adapter elements are very simple and can be manufactured very cheaply, are lightweight and small, thus needing very little storage space.

Further preferably, two adapter elements having a C-shape are provided, each of their respective rim portions forming, at least partially, three sides of a rectangle which coincide with an upper edge of the deck. This corresponds to a second exemplary embodiment of the invention that will be described in more detail later. In particular, this embodiment allows for maximum sturdiness and stability. In case large heavy loads were to be supported on the deck, these adapter elements allow maximum lateral support. If a shape of the dolly or pallet is rectangular with two opposing short sides and two opposing long sides, the adapter elements according to this embodiment may be connectable both to the long sides of a small version of such a dolly or pallet and to the short sides of a large version of such a dolly or pallet. In this manner, depending on the load to be transported or stored, differently sized dollies or pallets can be chosen.

The dolly or pallet body and/or the adapter element each may be integrally formed (one piece) and may be is made of plastic, in particular thermoplastic, e.g. by injection moulding.

The object of the invention is further achieved by providing an adapter element for use in a transport platform according to the description above, said adapter element being provided with one or more legs, each comprising an engagement portion, preferably tabs or protrusions, for being received and snap-fitted into a corresponding opening provided in the deck of the transport platform. For a detailed description concerning the design of the adapter element, the above description of the transport platform having one or more such adapter elements is referred to.

DESCRIPTION OF THE FIGURES

The following figures illustrate exemplary embodiments of the invention, wherein like reference numbers refer to like elements. The invention is not limited to the embodiments described below. Other embodiments, combinations of embodiments and modifications may be provided within the scope of protection defined by the claims.

FIG. 1 shows a dolly body 1 of a dolly, which forms a transport platform according to a first embodiment of the invention. The dolly body 1 has a substantially rectangular form and has a deck 2 or topside on which loads can be stored and transported. Although not shown in the drawings, the dolly may be provided with wheels attached to the bottom of the dolly body 1, for example as disclosed in WO2017/130167.

Figure 1:
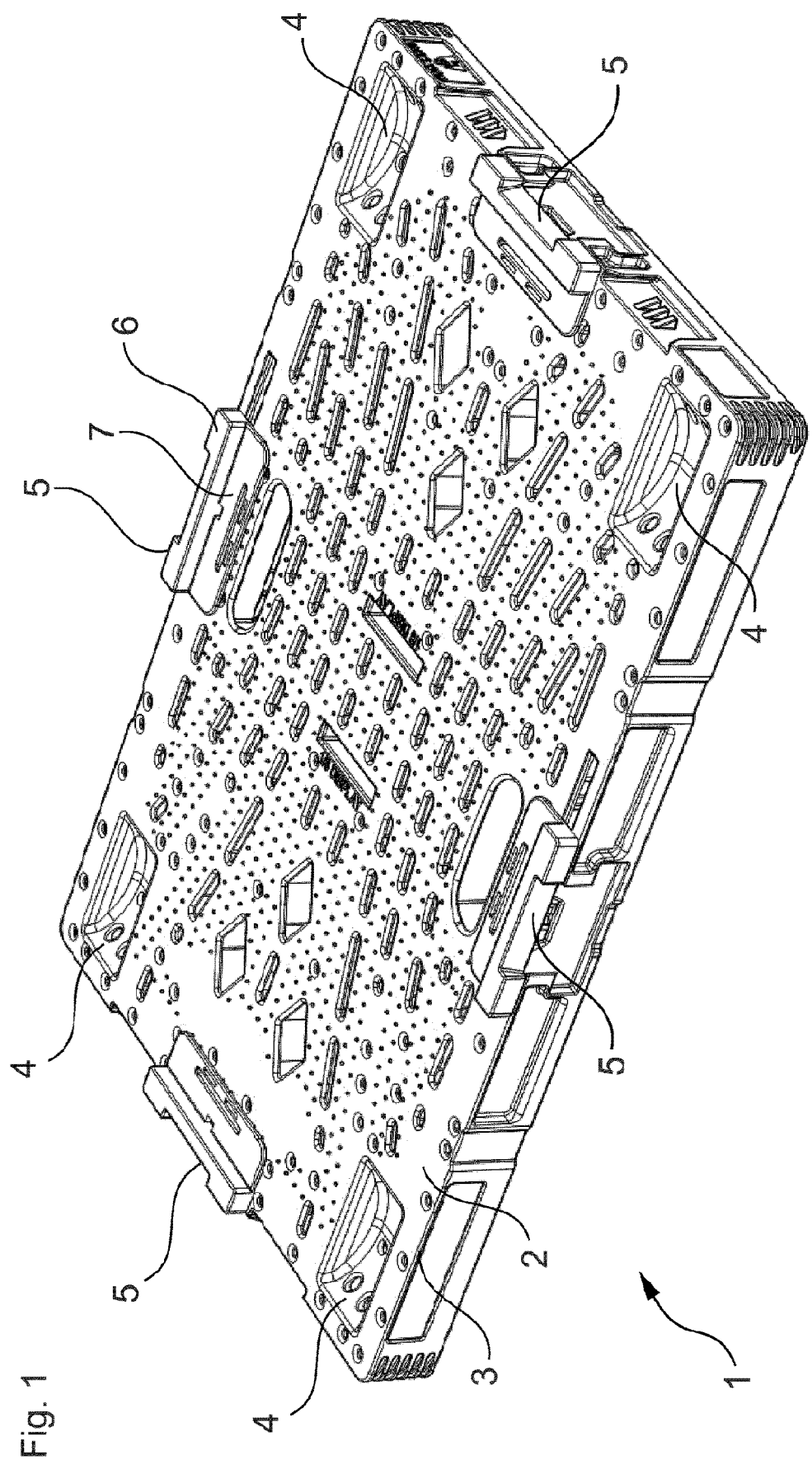
FIG. 1 shows a perspective view of a transport platform according to a first embodiment.

The deck 2 is substantially flat. An upper edge 3 of the dolly body 1 surrounds the deck 2 and is level and flush with the deck 2, i.e. it does not protrude from the deck 2 in an upward direction. At corner portions of the deck 2, wheel recesses 4 having a sectional cylindrical shape are formed which are adapted to receive wheels of a second dolly which can be stacked onto the dolly body 1 according to this embodiment. Further, in the deck 2 of the dolly body 1, a plurality of holes and recesses are provided extending into the dolly body 1 which e.g. provide hand holds or mounts, reduce the overall weight of the dolly body 1, remove liquids from the deck 2 of the dolly body 1 and/or are provided in order to avoid accumulations of material which are disadvantageous in moulding.

Four identical adapter elements 5 are connected to the deck 2 of the dolly body 1 in such a manner that each adapter element 5 is arranged centrally on a different side or upper edge portion of the deck 2.

Each adapter element 5 comprises a vertically protruding rim portion 6 and a substantially plate-shaped base portion 7. The rim portion 6 extends longitudinally along the upper edge 3, protrudes from the deck 2 in an upward direction and has an outer flank which is flush with the upper edge 3 of the deck 2. The outer flank of the rim portion 6 also defines an outer flank of the adapter element 5 as a whole. An inner flank of the rim portion 6 opposite to the outer flank and facing inwards is adapted to provide lateral support for loads placed on top of the deck 2. The substantially plate shaped base portion 7 extends from the rim portion 6 inwards, towards a centre of the dolly and rests directly on the deck 2. Together, the rim portions 6 of the adapter elements 5 may provide a stacking rim or stacking rim portions for stacking complementary stacking boxes onto the deck 2. Thus, the dolly body 1 having the adapter elements 5 may be part of a stacking system, wherein the stacking rim provides a form closure with lower stacking structures of corresponding stacking boxes. The rim portions 6 may also serve as simple restraining rim portions for supporting and restraining goods loaded onto the deck 2 in a lateral direction.

Figure 2:
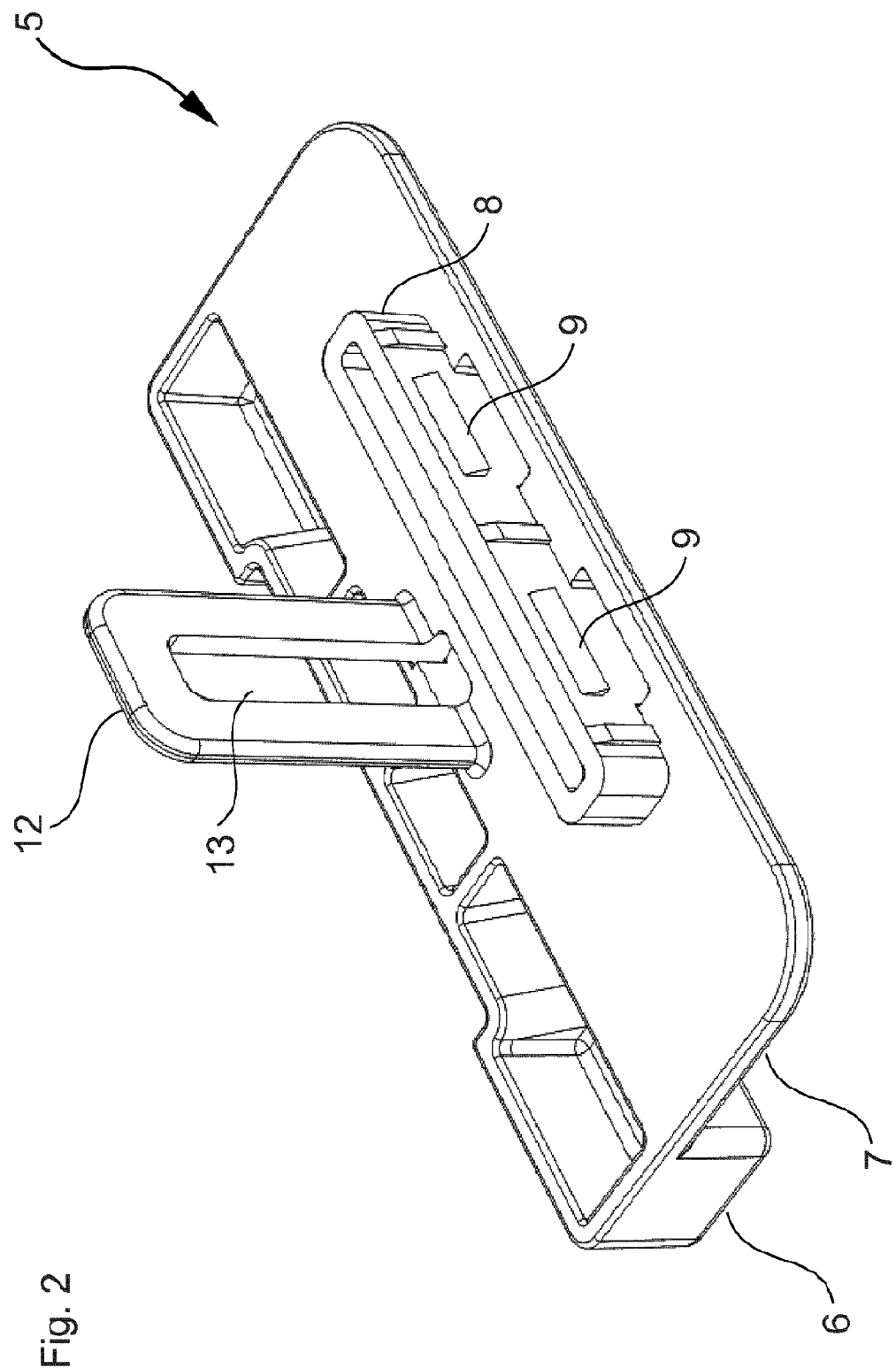
FIG. 2 shows a perspective bottom view of an adapter element according to the first embodiment.

FIG. 2 shows a bottom view of the adapter element 5 according to the first embodiment of the invention. A lower surface of the base portion 7 is adapted to rest against the deck 2 of the dolly body 1 when the adapter element 5 is placed onto and connected to the deck 2. At an inner end of the base portion 7, which is an end opposite of the outer flank of the adapter element 5, an inner leg 8 projects from the base portion 7 orthogonally thereto in a downward direction. Further, the inner leg 8 is extends longitudinally in a direction parallel to the rim portion 6, thus providing a large surface for arranging an engagement portion 9 thereon as well as for bracing against a corresponding inner surface of a corresponding inner opening 10 in the deck 2. The inner opening 10 extends through the dolly body 1 and the inner leg 8 is inserted or insertable therein. The inner leg 8 is substantially rectangular if viewed orthogonally to the base portion 7 and is therefore very stiff and robust. The inner leg 8 is hollow, providing a through hole which extends both through the base portion 7 and the inner leg 8.

On an inner flank of the inner leg 8, i.e. on a side of the inner leg 8 that is facing away from the outer flank, two protrusions 9 are provided. The protrusions 9 form the engagement portion of the inner leg 8 and are adapted to be snap-fitted into a corresponding engagement portion 11 of the inner opening 10. Since the protrusions 9 provide a long engagement portion or more accurately, several engagement portions distributed along a line parallel to the rim portion 6, this engagement portion is very robust, even if an eccentric force would act on the adapter element 5, e.g. due to a hit to one corner of the rim portion 6.

At an outer end of the base portion 7, which is an end adjoining the outer flank of the adapter element 5, an outer leg 12 projects from the base portion 7 orthogonally thereto in a downward direction and extends further downwards than the inner leg 8. More accurately, the outer leg 12 is arranged on the lower surface of the base portion 7 at a position directly adjacent to the rim portion 6 in an inward direction. The outer leg 12 is formed as a tab or tongue having a through hole 13 which serves as an engagement portion of the outer leg 12. This tab is adapted to be snap-fitted into a corresponding engagement portion 14 located within an outer opening 15 in the deck 2 which extends through the dolly body 1 and into which the outer leg 12 is inserted or insertable. The through hole 13 extends both through the outer leg 12 as well as upwards through the base portion 7. The inner opening 10 and the outer opening 15 form a set of openings configured to receive the inner leg 8 and the outer leg 12, respectively.

Directly opposite from the rim portion 6, several recesses separated by ribs are provided, such that the rim portion 6 is substantially hollow. Thereby, material accumulations are avoided while the ribs provide stability and stiffness of the rim portion 6.

Figure 3:
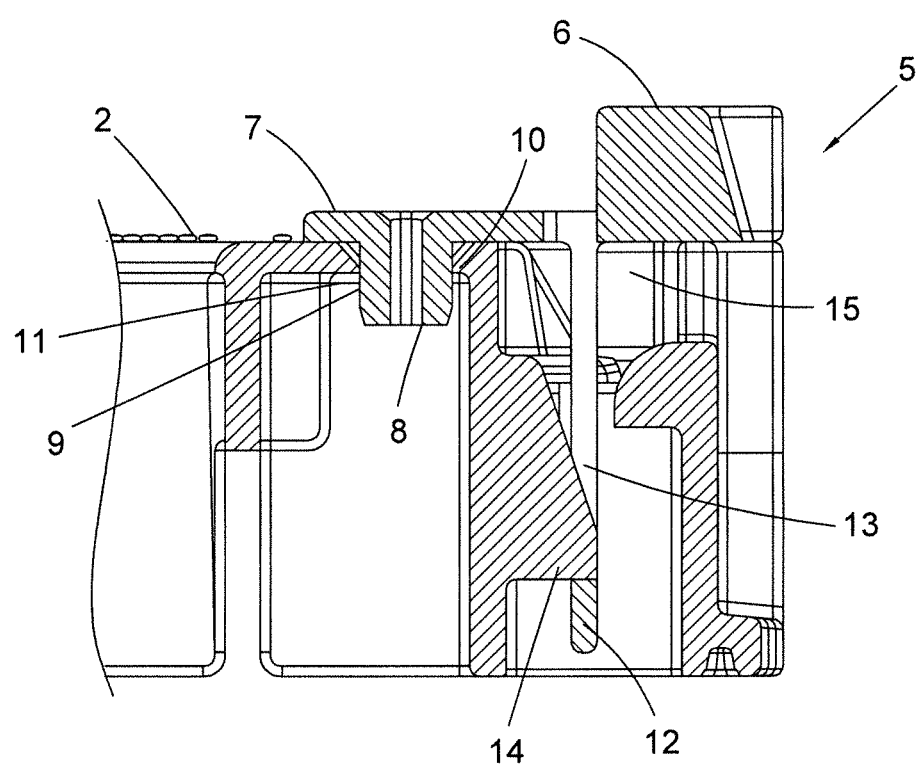
FIG. 3 shows a partial sectional view of the transport platform according to the first embodiment with one of the adapter elements in an assembled state.

FIG. 3 shows a partial sectional view of the dolly body 1 into which one of the adapter elements 5 is inserted, thus illustrating the snap-fit coupling connecting the adapter element 5 to the deck 2. A sectional plane of the sectional view is a symmetry plane of the dolly body 1 extending orthogonally to the outer flank of the rim portion 6, i.e. orthogonally to both the upper edge 3 and the deck 2 of the dolly body 1.

As can be seen in FIG. 3, the inner leg 8 fits snugly into the inner opening 10 in the deck 2 is relatively thick in a direction orthogonal to the outer flank of the rim portion 6 and relatively short in the downward direction. Due to this, as mentioned before, the inner leg 8 is rather stiff and braces against the inner surface or the inner opening 10. The protrusions 9 are very small, protruding from the inner leg 8 only slightly inwards, towards the centre of the dolly, so that they can snap into the corresponding engagement portion 11 provided in the inner opening 10. This corresponding engagement portion is an edge 11 provided in the inner opening 10 which the protrusions 9 catch onto, i.e. with which the protrusions 9 come in undercutting engagement. The edge 11 is a sharp edge that the small protrusions 9 can hold securely without slipping. For the same reason, the protrusions 9 have sharp edges as well.

The through hole 13 of the outer leg 12 snaps over the corresponding engagement portion 14 when the respective adapter element 5 is connected to the deck 2, forming another an undercutting engagement. This corresponding engagement portion is a nose 14 protruding from an inner surface of the outer opening 15 in an outwards direction, away from the centre of the dolly. The side of the nose 14 facing the deck 2 of the dolly body 1 forms a ramp.

Compared to the inner leg 8, the outer leg 12 is slim in the direction orthogonal to the outer flank of the rim portion 6 and is relatively long in the downward direction, about three to four times as long as the inner leg 8, extending almost through the whole dolly body 1. Thus, the outer leg 12 can be elastically deformed. Thereby, when connecting the adapter element to the deck 2, the outer leg 12 contacts the ramp formed by nose 14, is pressed to the side by it and accordingly bends until a lower end of the nose 14 reaches the through hole 13. Then, the outer leg 12 snaps over the nose 14, the nose 14 being inserted into the through hole 13 of the outer leg 12. Due to the large elastic deformation of the outer leg 12, the area forming the corresponding undercutting engagement is wide in the direction orthogonal to the outer flank of the rim portion 6 and thus, the engagement is unlikely to slip. The lower surface of the nose 14 and the through hole 13 provide defined contact surfaces and edges.

When the adapter element 5 is being connected to the deck 2, the longer outer leg 12 is inserted first and pressed to the side and then, later, the inner leg 8 is inserted. Therefore, the force needed to press the adapter element 5 into the set of openings 10, 15 gradually increases during inserting. Also, by first inserting the longer outer leg 12, the inserting of the inner leg 8 is guided via the already partially inserted outer leg 12.

The two protrusions 9 on the inner leg 8 and the through hole 13 of the outer leg 12 form a triangle. This results in a particularly stable connection of the respective adapter element 5 to the deck 2 and enables the adapter element 5 to absorb forces applied thereto in any direction. Therefore, it is unlikely that one or several of the adapter elements 5 is levered out from the deck 2. Additionally, if a load, e.g. a stacking box or a different suitably dimensioned box, is loaded onto the deck 2, the box is seated on the plate-like base portions 7 which lie flat on the deck 2. Any load pressing laterally against the rim portion 6 results in a torque, since the rim portion 6 extends upwards from the base portion 7 and thus acts as a lever. This torque is counteracted by the weight of the load itself since it presses down on the base portion 7. Thus, the risk of levering out the adapter elements 5 is further minimized.

In order to remove the adapter elements 5 form the deck 2, the legs 8, 12 can be accessed from the underside of the dolly body 1 via a tool such as a slotted screw driver and can then be pushed away from the engagement structures 11, 14 of the dolly body 1 in order to disengage the snap-fit couplings. Simultaneously, the respective adapter element 5 is pushed or drawn upwards out of the deck 2. Thus, the adapter elements can be reused after disengagement. Also, the transport platform may be reused either without adapters or with differently placed adapters.

The dolly body 1 and/or each adapter element 5 is integrally formed (one piece) and is made of plastic, in particular thermoplastic, e.g. by injection moulding, or may be formed by rapid prototyping or additive manufacturing.

The adapter element 5 may be attached or connected to the deck 2 without any tools, just by placing the adapter element 5 on the deck 2 and by inserting and pushing the legs 8 and 12 into respective opening 10 provided in the deck.

Figure 4:
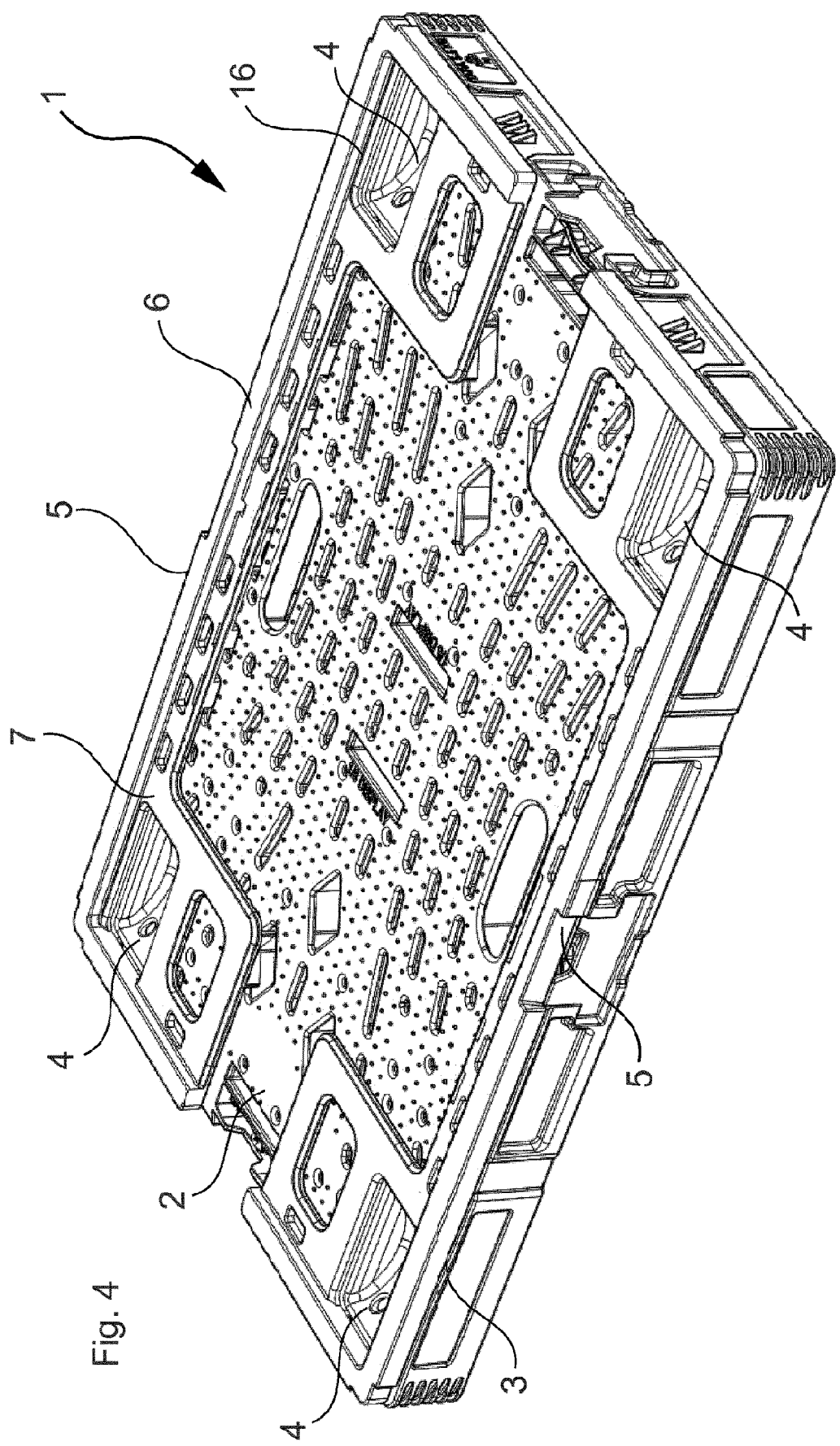
FIG. 4 shows a perspective view of a transport platform according to a second embodiment of the invention.

FIG. 4 shows a dolly body 1 according to a second embodiment of the invention. The following description focusses on the differences and additional advantages of the second embodiment.

While the deck 2 having an upper edge and the dolly body 1 are mostly the same as those according to the first embodiment, only two adapter elements 5 which are identical to each other are provided. Each adapter element 5 is substantially C-shaped, the C-shape encompassing about one half of the deck 2, with a C-base extending along one entire side or upper edge portion of the dolly body 1 and one C-arm extending from each end of the C-base orthogonally thereto and extending along part of an adjoining side or upper edge portion of the dolly body 1. A rim portion 6, which, similar to the rim portion of the first embodiment, extends from a flat base portion 7 of the adapter element 5 in an upwards direction and extends along an outer edge of the C-shape, defines an outer flank which is flush with the upper edge of the deck 2. The rim portion 6 of each adapter element 5 at least partially forms three sides of a restraining rim or stacking rim.

Two corners of the base portion 7, which are part of the C-arms, respectively, overlap wheel recesses 4 provided in the deck 2 which correspond to those described in the first embodiment. In order to provide access to the wheel recesses 4, the base portion 7 has corresponding through holes 16 which are aligned with and dimensioned according to the wheel recesses 4 such that they are completely exposed.

Figure 5:
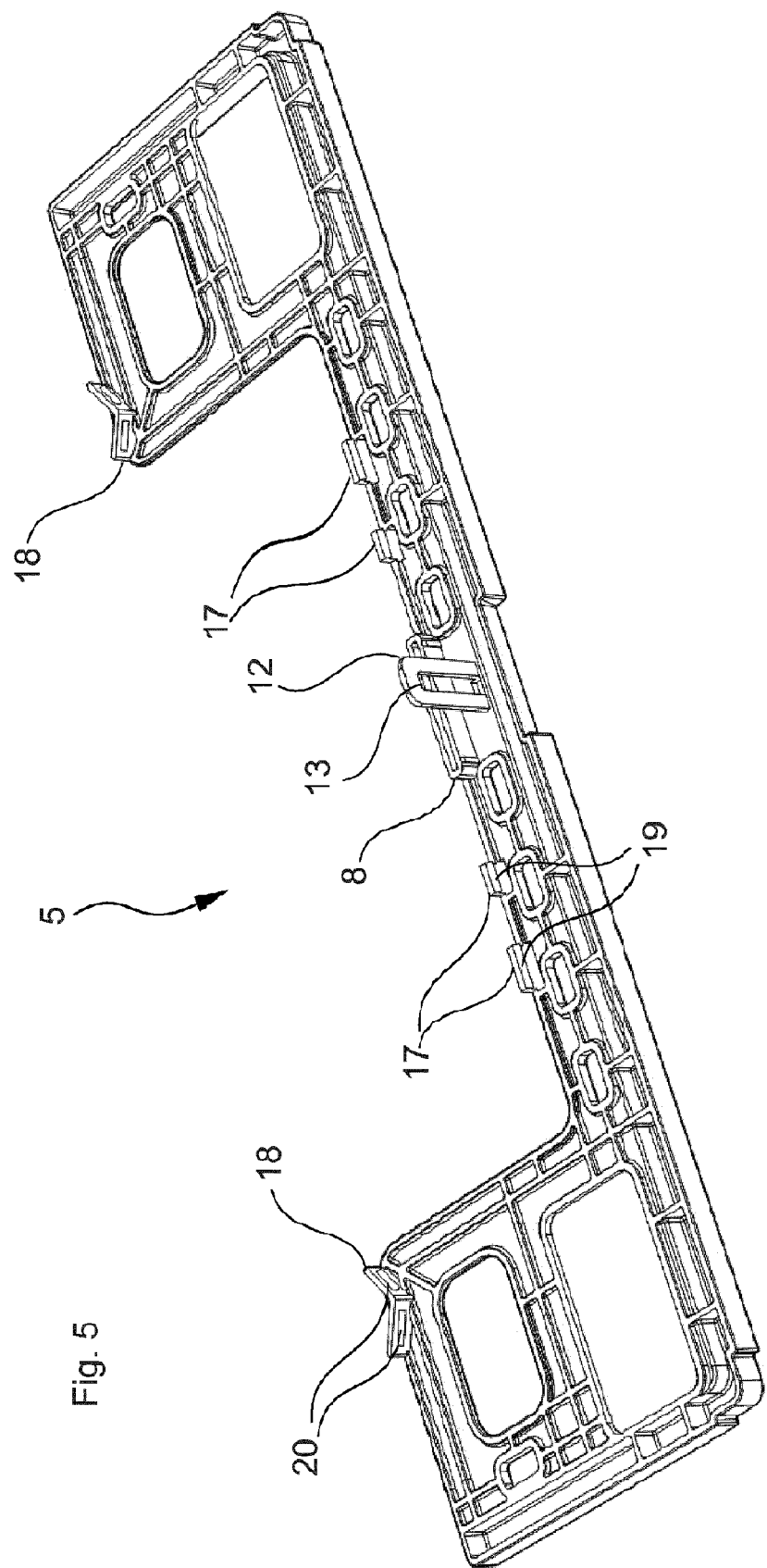
FIG. 5 shows a perspective bottom view of an adapter elements according to the second embodiment.

FIG. 5 shows a bottom view of one of the adapter elements 5 according to the second embodiment. Centrally arranged on the C-base are an inner leg 8 with protrusions 9 (not visible from this perspective) and an outer leg 12 with a through hole 13 which are similar to those described in the first embodiment. Accordingly, respective holes or openings 10, 15 with corresponding engagement portions 11, 14 are provided in the deck 2.

Further, extending from a lower surface of the base portion 7 downwards, additional inner legs 17 are arranged along an inner edge of the C-base in alignment with the inner leg 8 and additional corner legs 18 arranged on corners facing inwards at free ends of the C-arms are provided. These legs 17, 18 have the same length as the inner leg 8 in the downwards direction. Protrusions 19 formed on the additional inner legs 17 extend therefrom in an outwards direction. Therefore, the protrusions 9 of the inner leg 8 and the protrusions 19 of the additional inner legs 17 extend in opposite directions and thus act against one another.

The corner legs 18 have a V-shape when viewed in a direction orthogonal to the base portion 7. Therein, a symmetry axis of the V-shape is orthogonal to the outer flank of the C-base of the adapter element 5. A pointed V-centre, i.e. the middle of the V-shape, where the two arms of the V-shape or V-arms meet, points towards the C-base. That is, the V-arms extend from the V-centre having a predefined angle relative to the outer flank of the C-base of the adapter element 5. The predefined angle is preferably chosen such that a flank of one of the V-arms substantially faces towards one of the ends of the C-base of the adapter element 5 and therefore, when the adapter element 5 is mounted to the deck 2, towards a corner of the deck 2. In particular, the predetermined angle may be chosen such that a line orthogonal to the V-arm can be drawn from the V-arm to the respective end of the C-base. At flanks of the V-arms which face away from one another, protrusions 20 are provided. Due to the angle of the V-arms and therefore the corresponding protrusions 20, forces acting eccentrically, particularly in an angled direction, on the rim portions 6, may act on the corresponding V-arms along a direction which is preferably approximately orthogonal thereto, thus optimizing force transmission.

A set of openings 10, 15, 21, 22 provided in the deck 2 for receiving the legs 8, 12, 17, 18 is provided within the deck 2. The openings 22 for receiving the corner legs 18 are diamond shaped, the predefined angle of the V-arms of the corner legs corresponding to the angle of the diamond shaped openings 22. With regards to further details concerning the design of openings and engagement portions arranged in the deck, the description of the first embodiment should be referred to. In particular concerning the openings 21, 22 and engagement portions corresponding to the additional inner legs 17 as well as the corner legs 18, the description of the inner opening 10 and the edge 11 provided therein of the first embodiment, as shown in FIG. 3, should be referred to. All openings 21, 22 corresponding to the additional inner legs 17 and/or the corner legs 18 may be provided in the deck 2 of the dolly body 1 according to the first embodiment as well, i.e. the deck 2 and dolly body 1 according to the first embodiment is the same as the deck 2 and dolly body 1 according to the second embodiment. Thereby, adapter elements 5 according to either the first or the second embodiment may be connected to the same basic deck 2 and dolly body 1.

Figure 6:
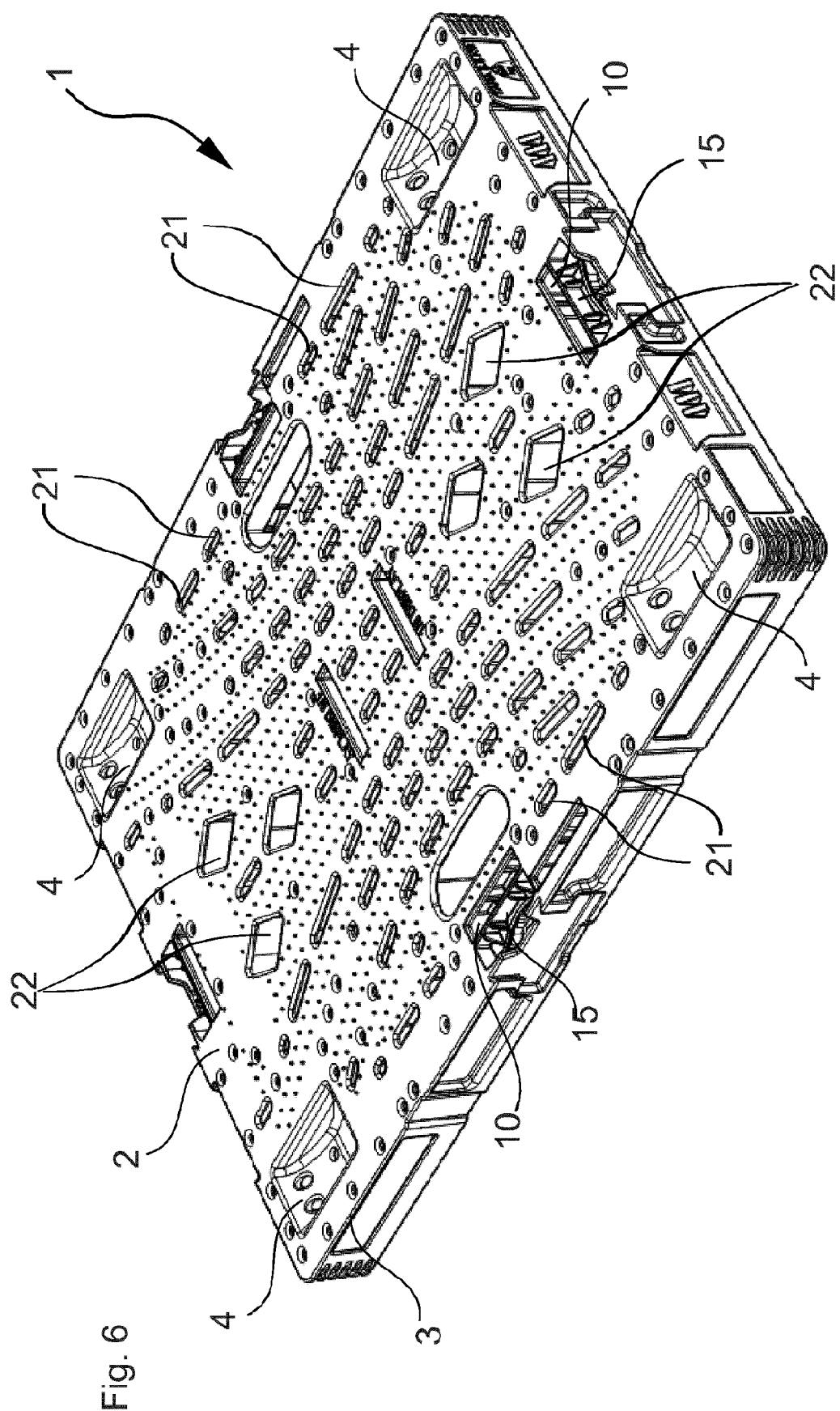
FIG. 6 shows a perspective view of a transport platform according to both the first and the second embodiment of the invention.

FIG. 6 shows the transport platform according to both the first and the second embodiment wherein no adapter elements 5 are inserted. In the deck 2, openings 10, 15, 21, 22 for inserting the legs 8, 12, 17, 18 of the adapter elements 5 of either embodiment are provided. Centrally arranged on each side of the deck 2 and near the upper edge 3, the inner and outer openings 10, 15 are provided respectively for receiving the inner and outer legs 8, 12 of the adapter elements 5. Additional inner openings 21 for receiving the additional inner legs 17 of the adapter elements 5 according to the second embodiment are provided which are aligned with the inner opening 10 in a direction parallel to the upper edge 3. Further, the diamond shaped openings 22 for receiving the corner legs 18 are arranged in the deck 2 at positions located distanced further from the upper edge 3 than the other openings 10, 15, 21. Thus, this illustration particularly shows that either kind of adapter elements 5 can be used with one and the same dolly body 1.

In the first and second embodiments, the dolly body 1 forms a transport platform according to the present invention. Alternatively, a (Euro) pallet, a quarter pallet of half pallet as well as pallets of other sizes may also be used as the transport platform according to the present invention, as long as the pallet has a deck which is provided with respective openings 10, 15 and engagements portions 11, 14 for receiving and engaging with the legs 8, 10 of the adapter element 5.

LIST OF REFERENCE NUMBERS 1 dolly body
2 deck
3 upper edge
4 wheel recess
5 adapter element
6 rim portion
7 base portion
8 inner leg
9 protrusion, engagement portion of the adapter element
10 inner opening
11 edge, engagement portion
12 outer leg
13 through hole, engagement portion of the adapter element
14 nose, engagement portion
15 outer opening
16 through holes for wheel recesses
17 additional inner legs
18 corner legs
19 protrusions of the additional inner legs
20 protrusions of corner legs
21 additional inner openings
22 diamond shaped openings

The invention claimed is:

1. An adapter element to be connected to a deck of a transport platform, and comprising:
   a base portion to be placed on top of the deck;
   a rim portion extending from said base for restraining loads, at least in a lateral direction, placed on top of the deck; and
   at least one leg including an outer leg extending from said base portion and configured as a tab having a through hole, with the tab to be received and snap-fitted into a corresponding opening in the deck.

2. The adapter element according to claim 1, wherein said at least one leg is located at a distance from an outer flank of said rim portion configured to coincide with an upper edge of the deck when the adapter element is connected thereto.

3. The adapter element according to claim 1, wherein said at least one leg further includes at least one inner leg, wherein said inner and outer legs each have an elongated shape extending parallel to said rim portion and to each other.

4. The adapter element according to claim 3, wherein said inner leg is spaced apart from said rim portion in a lateral direction and arranged on an opposite side thereto of the adapter element.

5. The adapter element according to claim 1, wherein said at least one leg further includes at least one inner leg having an engagement portion to be received and snap-fitted into a corresponding opening in the deck, and wherein the engagement portions of said inner and outer legs are different from one another.

6. The adapter element according to claim 1, wherein said rim portion includes a pair of corner rim sections corresponding to corners of the deck, and a side rim section extending between the pair of corner rim sections.

7. The adapter element according to claim 1, wherein said base portion is configured to lie flush against the top of the deck.

8. The adapter element according to claim 7, wherein said base portion has at least one opening to provide access to at least one wheel recess of the deck and to accommodate wheels of another transport platform being stackable onto the transport platform when the adapter element is connected to the deck.

9. The adapter element according to claim 8, wherein said at least one leg further includes at least one corner leg having an elongated shape extending in a horizontal direction and having a predefined angle relative to said rim portion, such that a line extending orthogonally from a flank of the corner leg extends towards a corner of the deck when the adapter element is connected thereto.

10. A transport platform comprising a deck; and
   at least one adapter element to be connected to said deck, and comprising:
      a base portion to be placed on top of the deck,
      a rim portion extending from said base and configured to protrude from the deck for restraining loads, at least in a lateral direction, placed on top of the deck, and
      at least one leg including an outer leg extending from said base portion and configured as a tab having a through hole, with the tab to be received and snap-fitted into a corresponding opening in the deck.

11. The transport platform according to claim 10, wherein each corresponding opening is located such that, when said at least one adapter element is connected to the deck, said rim portion is flush with the upper edge of the deck.

12. The transport platform according to claim 10, wherein said deck includes a corresponding engagement portion into which a respective engagement portion of said at least one leg is snap-fitted, with the corresponding engagement portion located within the corresponding opening in the deck or at a lower side of the deck directly adjacent to the corresponding opening.

13. The transport platform according to claim 10, wherein said at least one adapter element comprises four adapter elements, wherein said rim portion of each adapter element forms at least one of a rectangular corner rim and longitudinal side rim.

14. The transport platform according to claim 13, wherein said at least one adapter element comprises two adapter elements, each adapter element having a C-shape with said rim portion forming, at least partially, three sides of a rectangle which coincide with an upper edge of said deck, when connected to said deck.

15. The transport platform according to claim 10, wherein said at least one leg is located at a distance from an outer flank of said rim portion configured to coincide with an upper edge of the deck when the adapter element is connected thereto.

16. The transport platform according to claim 10, wherein said at least one leg further includes at least one inner leg, wherein said inner and outer legs each have an elongated shape extending parallel to said rim portion and to each other.

17. The transport platform according to claim 16, wherein said inner leg is spaced apart from said rim portion in a lateral direction and arranged on an opposite side thereto of the adapter element.

18. The transport platform according to claim 10, wherein said at least one leg further includes at least one inner leg having an engagement portion to be received and snap-fitted into a corresponding opening in the deck, and wherein the engagement portions of said inner and outer legs are different from one another.

19. The transport platform according to claim 10, wherein said rim portion includes a pair of corner rim sections corresponding to corners of the deck, and a side rim section extending between the pair of corner rim sections.

20. The transport platform according to claim 10, wherein said base portion is configured to lie flush against the deck when the adapter element is connected to the top of deck, and wherein said base portion has at least one opening to provide access to at least one wheel recess of the deck and to accommodate wheels of another transport platform being stackable onto the transport platform when the adapter element is connected to the deck.

* * * * *